(12) United States Patent
Sugar et al.

(10) Patent No.: US 7,672,284 B2
(45) Date of Patent: *Mar. 2, 2010

(54) THROUGHPUT IN MULTI-RATE WIRELESS NETWORKS USING VARIABLE-LENGTH PACKETS AND OTHER TECHNIQUES

(75) Inventors: Gary L. Sugar, Rockville, MD (US); William R. Seed, Gaithersburg, MD (US); Anthony T. Collins, Gaithersburg, MD (US)

(73) Assignee: IPR Licensing, Inc., Wilmington, DE (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/880,204

(22) Filed: Jul. 20, 2007

(65) Prior Publication Data

US 2007/0263657 A1 Nov. 15, 2007

Related U.S. Application Data

(63) Continuation of application No. 10/065,494, filed on Oct. 24, 2002, now Pat. No. 7,248,604.

(60) Provisional application No. 60/330,755, filed on Oct. 30, 2001.

(51) Int. Cl.
H04Q 7/24 (2006.01)
(52) U.S. Cl. .................. 370/338; 370/447; 370/468

(58) Field of Classification Search .............. None
See application file for complete search history.

(56) References Cited

U.S. PATENT DOCUMENTS

| | | | |
|---|---|---|---|
| 6,118,788 | A | 9/2000 | Kermani et al. |
| 6,285,662 | B1 | 9/2001 | Watanabe et al. |
| 6,404,772 | B1 | 6/2002 | Beach et al. |
| 6,965,942 | B1 | 11/2005 | Young et al. |

OTHER PUBLICATIONS

Cali et al., "Dynamic Tuning Of The IEEE 802.11 Protocol To Achieve Theoretical Throughput Limit", IEEE/ACM Transactions On Networking, vol. 8, No. 6, (Dec. 2000).

LAN MAN Standards Committee of the IEEE Computer Society, "Information Technology— Telecommunications And Information Exchange Between Systems—Local And Metropolitan Area Networks—Specific Requirements—Part 11: Wireless LAN Medium Access Control (MAC) And Physical Layer (PHY) Specifications", ANSI/IEEE Std 802.11, 1999 Edition (R2003), (Reaffirmed Jun. 12, 2003).

(Continued)

*Primary Examiner*—Frank Duong
(74) *Attorney, Agent, or Firm*—Volpe and Koenig, P.C.

(57) ABSTRACT

In a wireless communication network having a plurality of devices operating at different data rates that contend for access to the network, a method is provided that assigns network access parameters to one or more of the devices so as to control throughput on the network. Examples of network access control parameters are the maximum data packet size and the contention window size. Generally, the network access control parameter for slower data rate users is configured so that they do not occupy the network a disproportionate amount of time compared to faster data rate users.

7 Claims, 6 Drawing Sheets

OTHER PUBLICATIONS

LAN/MAN Standards Committee of the IEEE Computer Society, "Supplement To IEEE Standard For Information Technology—Telecommunications And Information Exchange Between Systems—Local And Metropolitan Area Networks—Specific Requirements, Part 11: Wireless LAN Medium Access Control (MAC) And Physical Layer (PHY) Specifications, High-Speed Physical Layer In The 5 GHz Band", IEEE Std 802.11a-1999(R2003), (Reaffirmed Jun. 12, 2003).

LAN/MAN Standards Committee of the IEEE Computer Society, "Supplement To IEEE Standard For Information Technology—Telecommunications And Information Exchange Between Systems—Local And Metropolitan Area Networks—Specific Requirements—Part 11: Wireless LAN Medium Access Control (MAC) And Physical Layer (PHY) Specifications: Higher-Speed Physical Layer Extension In The 2.4 GHz Band", IEEE Std 802.11b-1999 (R2003), (Reaffirmed Jun. 12, 2003, Approved Sep. 16, 1999).

Satapathy et al., "Spectrum Sharing Without Licenses: Opportunities And Dangers", Proceedings Of The Telecommunications Policy Research Conference (TPRC), pp. 1-19, (1996).

Vaduvur Bharghavan, "Performance Evaluation Of Algorithms For Wireless Medium Access", IEEE International Computer Performance And Dependability Symposium IPDS'98, pp. 142-149, (1998).

Wang et al., "Achieving Fairness In IEEE 802.11 DFWMAC With Variable Packet Lengths", A Presentation At GLOBECOM, (San Antonio, Texas, Nov. 26, 2001).

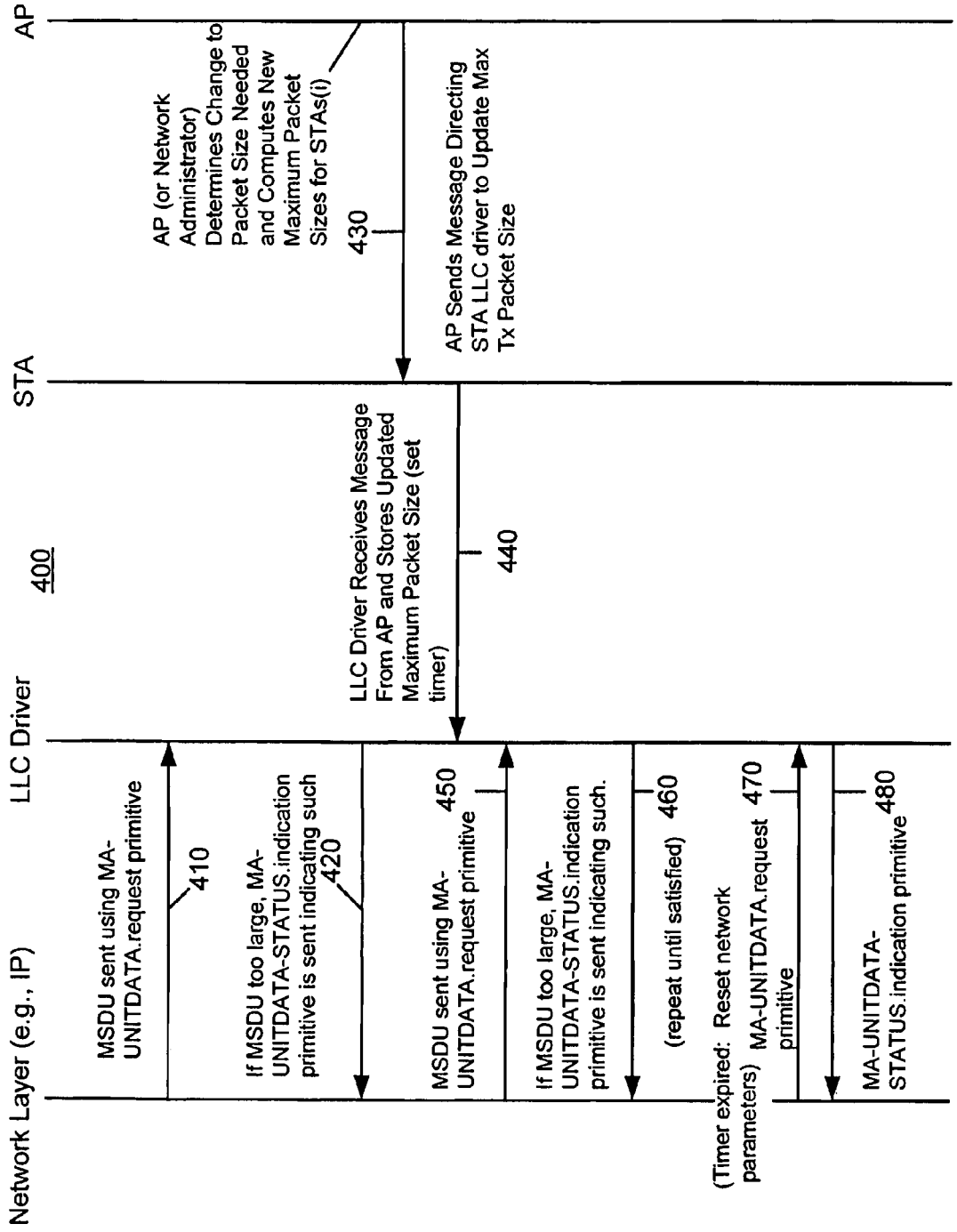

THROUGHPUT IN MULTI-RATE WIRELESS NETWORKS USING VARIABLE-LENGTH PACKETS AND OTHER TECHNIQUES

This application is a continuation of U.S. Non-Provisional patent application Ser. No. 10/065,494, filed Oct. 24, 2002 which claims priority to U.S. Provisional Patent Application No. 60/330,755, filed Oct. 30, 2001, the entirety of which is incorporated herein by reference as if fully set forth.

BACKGROUND OF THE INVENTION

The present invention is directed to wireless networks, and particularly to optimizing throughput among multiple data rate communication devices in a wireless network.

In a wireless network, such as a wireless local area network (WLAN) that uses the IEEE 802.11x standard, communication devices that act as what is called in 802.11 parlance, stations (STAs), may use multiple data rates (e.g., 1, 2, 5.5, 11, ... 54 Mbps) when communicating with a communication device that acts as what is called in 802.11 parlance, an access point (AP). The data rate assigned to a STA may be based on its proximity to the AP. For example, devices closer to the AP typically operate at faster data rates than devices further from the AP. Each frequency channel of 802.11 may be shared, via carrier sense multiple access/collision avoidance (CSMA/CA) procedures, by multiple STAs using various data rates. Each STA contends for use of the frequency channel and, on acquiring use of the channel, transmits a single MAC Service Data Unit (MSDU). While a given STA is transmitting an MSDU, no other STA is allowed to transmit on the channel. Additionally, the STA owns the channel until it has completely transmitted the MSDU. After transmitting an MSDU, the STA must contend again for use of the channel before sending another MSDU.

Currently, the 802.11 standard places no restrictions nor does it provide a recommendation for a data packet length, other than limiting the maximum MSDU size to no more than 2304 bytes. The required transmission time for a data packet of a given length is proportionally larger for low data rate users than for high data rate users. Consequently, the low data rate users may have a disproportionately higher percentage of medium access time than high data rate users, which limits throughput for the high data rate users.

To illustrate this, with reference to FIG. 1, an exemplary system 10 is shown having N STAs 120, where N=20. For example, there are ten 1 Mbps STAs and ten 54 Mbps STAs on a CSMA/CA WLAN. Each STA is attempting to upload a file to (or download a file from) a server via the WLAN AP 110. It is assumed each STA 120 uses a 2 KB MSDU size. To simplify the analysis, assume zero MAC overhead (i.e., MAC header, acknowledgements, DIFS, etc. take zero time). The following relations hold for this example.

Ts=Packet duration for "slow" users=2048*8/1=16,384 µs
Tf=Packet duration for "fast" users=2048*8/54=303 µs=Ts/54
Throughput per slow user: 1 Mbps*54/55/10≅100 kbps
Throughput per fast user: 54 Mbps*1/55/10≅100 kbps
Average throughput per user: 100 kbps As this example shows, the slow users take much longer to transmit their packets than the fast users, effectively negating the benefit of the higher data rate for the fast users. More specifically, the slow users spend 54 times more time on the medium than fast users in this scenario (since it takes them 54 times longer to transmit or receive a 2 KB packet) assuming that all users contend for the medium using CSMA/CA procedures for the transmission of each packet. Slow users own the medium 54/55=98% of the time, whereas fast users own the medium 1/55=2% of the time. The results would be the same if a MSDU size of 500 bytes, for example, were used.

To generalize, assume there are Ns low data rate users and Nf high data rate users of a CSMA/CA WLAN. The following relations are given:

Ts=M*Tf=Packet duration for a slow users
Tf=Packet duration for fast users
M=ratio of highest data rate to lowest data rate for the users on the network (Rf/Rs)
Rf=Fastest user data rate
Rs=Slowest user data rate
Throughput for slow data rate user=Rs*Ts/(Ns*Ts+Nf*Tf)=Rs*M/(Ns*M+Nf)≈Rs/Ns (since Ns*M usually >>Nf)
Throughput for fast data rate=Rf*Tf/(Ns*Ts+Nf*Tf)=Rf/(Ns*M+Nf)≈Rs/Ns (again, assuming Ns*M>>Nf).
Average throughput per user ≈Rs/(Ns).

In summary, all STAs experience substantially the same throughput equal to the slowest user's data rate divided by the number of slow users. The high data rate users do not realize the benefit of their faster data rates because throughput is limited by the slowest user data rate.

In more extreme cases, the overall performance of a wireless network can collapse as additional users, particularly slow users, access the network. FIG. 2 illustrates a plot of access time of a user versus percent utilization of the network. Even at zero percent utilization, there is a minimum access time to for a user to obtain access to the network. As more users access the network, the access time increases, and at some point (approximately 50% utilization), the access time increases exponentially. FIG. 2 illustrates that throughput for all users on the network can become unacceptable as the network utilization increases, particularly with slow users, and at some the network may collapse completely. Network administrators struggle with techniques to prevent network collapse.

Solutions are needed to contend with the foregoing challenges in maintaining stability of a wireless network with multiple data rate users.

SUMMARY OF THE INVENTION

According to the present invention, systems and methods are provided to improve system throughput of a wireless network by adjusting a network access parameter used by devices when accessing the network. One technique is to assign packet lengths to each user in such a way as to ensure that all users transmit packets of equal duration. The packet duration for all users is set based on a maximum packet size at the fastest user data rate in the network. Thus, under this methodology, fixed-duration transmissions (from the STA to the AP or from the AP to the STA) are enforced (which implies different packet lengths for different user data rates) instead of fixed-length packets (duration=time, length=bytes) for each user. In practice, the user-rate specific packet size, determined for each user based on the desired fixed-duration, is set as a maximum packet size for that user. However, the user does not always have to transmit at that maximum packet size. A packet size of less than the maximum packet size may be used, which will further benefit average throughput.

An enhancement to the fixed-duration/variable packet length technique is to dynamically change the packet lengths of the network users to adjust for changing conditions in the network. For example, the data rate of the fastest user may change as users go on and off the network. The AP may periodically determine changes in the fastest user data rate and send out messages to the users to adjust the maximum length if required.

Another technique to optimize throughput in the network is to fix the packet length but vary the contention window (CW) size for each user, so that low rate users will be less likely to win a channel contention than high rate users.

Still another method to improve throughput in the network is to conditionally engage or disengage one of the variable packet length or variable contention window algorithms described herein based on measured network conditions for the fast users. The AP monitors user throughput, offered network load, or other conditions for fast rate users, and when it is determined that throughput for fast users is being significantly affected, the AP engages one of the variable packet length methods summarized above in order to give the fast rate users better throughput.

The above and other objects and advantages will become more readily apparent when reference is made to the following description taken in conjunction with the accompanying drawings.

BRIEF DESCRIPTION OF THE DRAWINGS

FIG. 6 is a ladder diagram illustrating a process for communicating and executing a change in the maximum packet length used by devices in a wireless network.

DETAILED DESCRIPTION OF THE DRAWINGS

Figure 1:
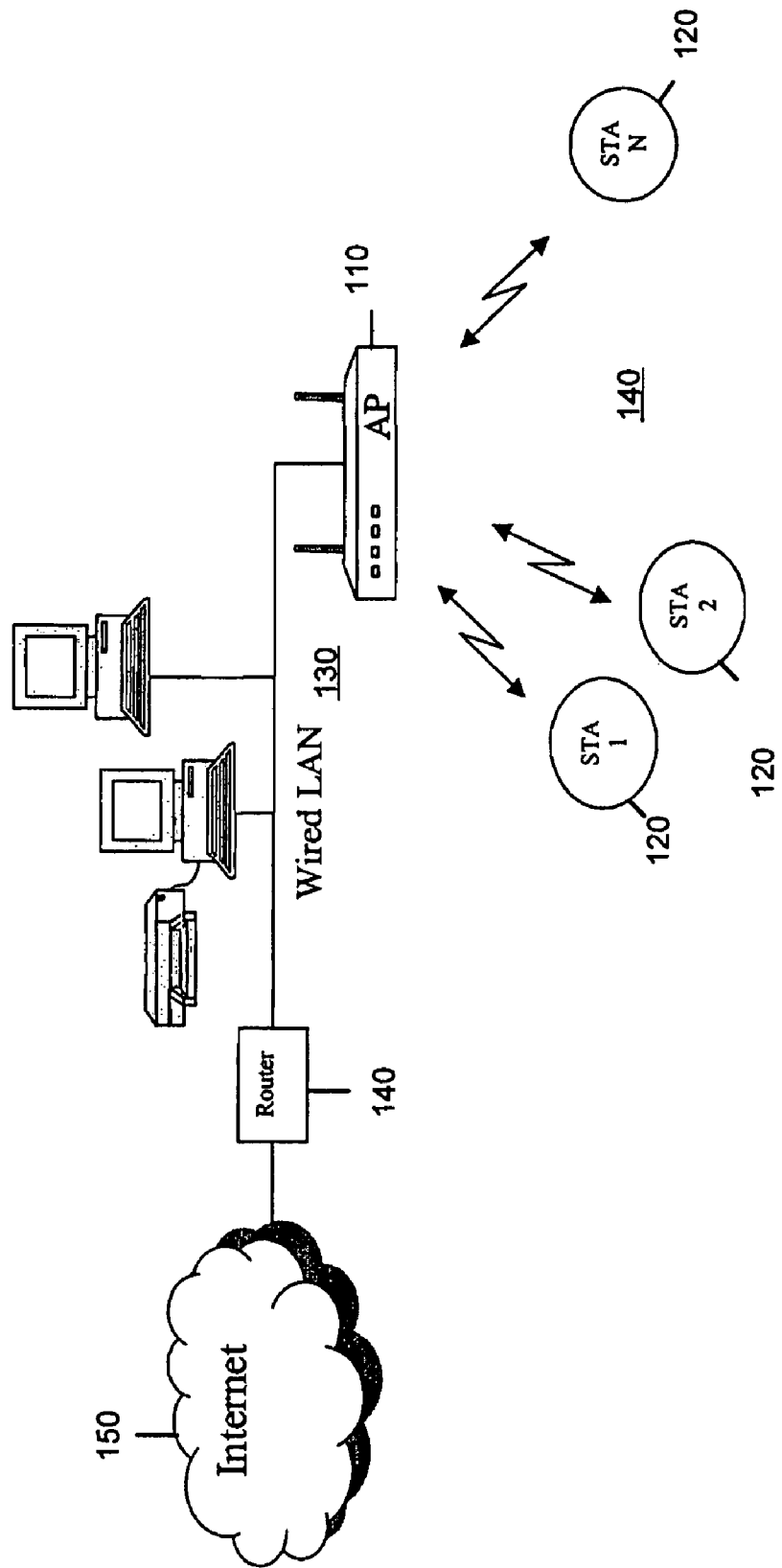
FIG. 1 is a block diagram of an exemplary wireless communication system where throughput improvement techniques may be useful.

FIG. 1 illustrates an exemplary system where a wireless local area network (WLAN) 100 consisting of an access point (AP) 110 and a plurality of stations (STAs) ($STA_1$-$STA_N$) 120. The AP 110 may interconnect to a wired LAN 130, and ultimately, through a router 140, to the Internet 150.

Figure 3:
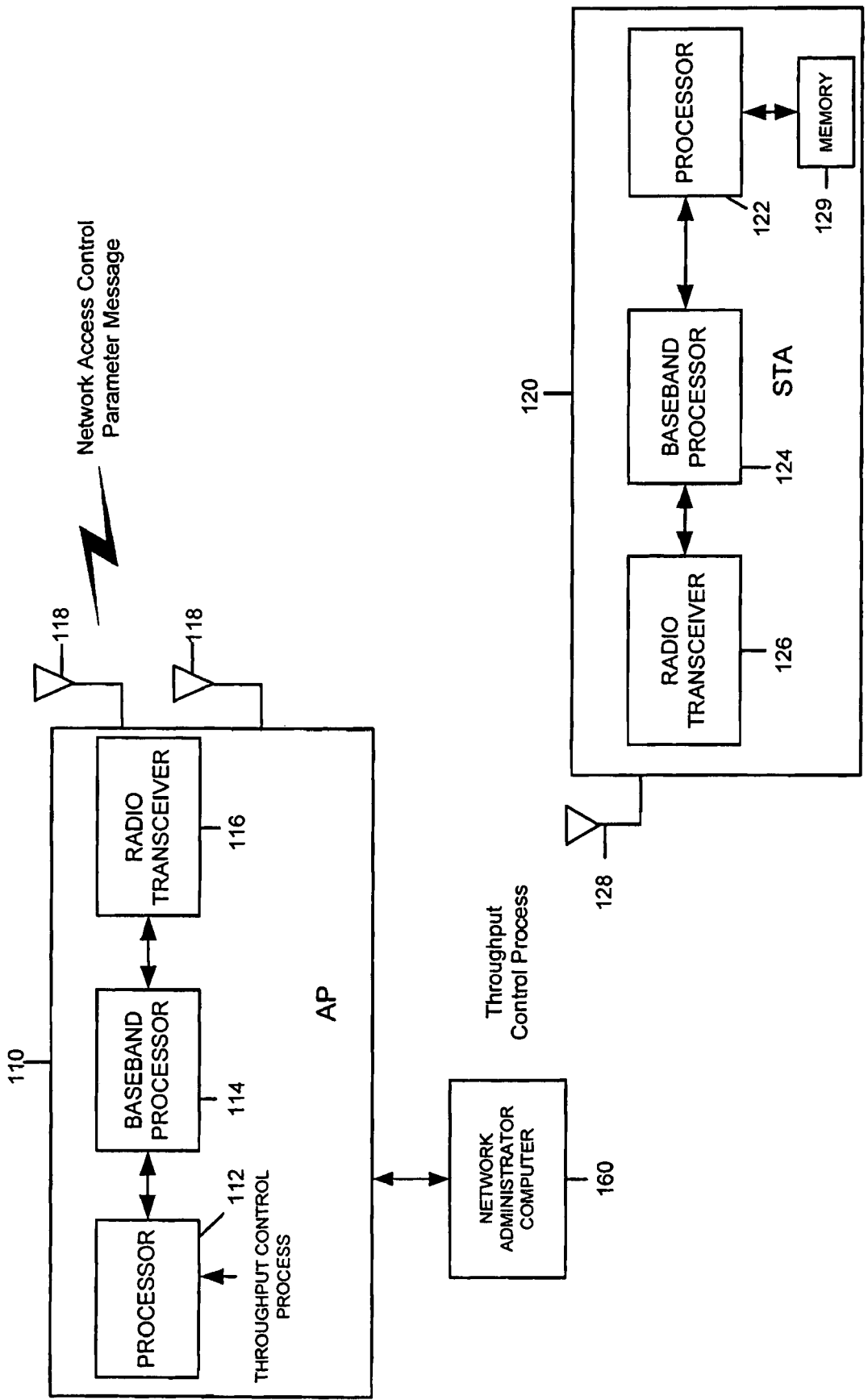
FIG. 3 is a block diagram of an access point device and a station device that may be configured to employ the throughput improvement techniques.

FIG. 3 illustrates an exemplary AP 110 and a STA 120. In general, the AP 110 comprises a control processor 112, a baseband signal processor 114 and a radio transceiver 116. (It should be understood that the control processor 112 and the baseband signal processor 114 may be implemented on a single processing device.) The AP 110 receives signals from, and transmits signals to, the STAs 120 via one or more antennas 118. The processor 112 routes the received data from the STAs, and also directs outgoing data to the appropriate STA. In addition, the processor 112 in the AP 110 may execute a network throughput control process, described hereinafter, to control the average throughput on the WLAN 100. A network administration computer 160 may be coupled to the AP 110 (through the wired LAN 130 shown in FIG. 1) to provide supervisory and administrative control of the WLAN 100. Thus, the network throughput control process may be executed on the network administration computer 160 in addition to, or instead of, the AP 110. The AP 110 sends network access control parameter messages to one or more STAs 120. The network access control parameter message informs the STA 120 to alter a network access parameter, described hereinafter. The term base device is a more general term that refers to an access point, or in the context of a non-WLAN type of wireless network, another wireless device that may be fixed and may have additional computing power and supervisory control over the access to the network by other devices.

A STA 120 comprises a control processor 122, a baseband signal processor 124 and a radio transceiver 126. The STA 120 transmits and receives signals via the antenna 128. When the STA 120 receives a network access control parameter message from the AP 110, the processor 122 processes the message to alter a corresponding network access control parameter. A memory 129 in the STA 110 may be used to store the updated network access control parameter.

The Packet Length Network Access Control Parameter

One type of network access control parameter that can be adjusted is the maximum packet length that can be used by a communication device when accessing the network. The maximum packet length parameter determines how much network time it takes for a device to transmit a basic unit of data called the packet, dependent on the data rate of the device. One method to equalize the use of the network is to require all devices to transmit packets of a fixed time duration (as opposed to a fixed packet length), regardless of the data rate of the device. To do so, slower data rate devices would have shorter maximum packet lengths compared to higher data rate devices. As a result, fast data rate devices can use a packet length up to the maximum packet length available for the network and slow data rate devices will be limited to a smaller maximum packet length so that they do not occupy the network at the expense of the faster rate devices. The packet length $L_i$ for device (i) is $L_{max}/(R_f/R_i)$, where $R_f$ is the rate of the fastest device, $R_i$ is the rate of the given device (i) and $L_{max}$ is the maximum packet length for any device on the network. The throughput analysis using the fixed-duration methodology is as follows. (The terms "device" and "user" are used interchangeably.)

Throughput per slow user=$R_s/(N_s+N_f)$

Throughput per fast user=$R_f/(N_s+N_f)$

Average throughput per user=$(N_s*R_s+N_f*R_f)/(N_s+N_f)^2$

The net throughput per user is equal to the peak throughput per user (i.e., throughput that each user would see if he/she were the only user on the channel) divided by the total number of users sharing the channel. This is exactly the throughput that each user would see if there were only one data rate supported on the channel (i.e., that user's data rate) and the same number of total users. Substantial improvement in average net throughput per user is achieved over the fixed-length approach for typical operating scenarios, and it is a more equitable way to distribute bandwidth among multiple users than the fixed-length approach.

Applying the fixed-duration packet technique to the example introduced above in conjunction with FIG. 1, the packet length for the fast (54 Mbps) users is set to the MSDU length of 2 KB to give the fast users the greatest benefit of their faster data rate. Thus, Lmax is 2 k bytes, or 2048 bytes, and the maximum packet length for the 1 Mbps user is 2048/(54/1), which is 38 bytes.

Using a variable packet length with the fixed-duration constraint, the throughput analysis for the example is:

Throughput per slow user=1 Mbps/20=50 kbps

Throughput per fast user=54 Mbps/20=2.7 Mbps

Average throughput per user=$(10*1+10*54)/(10+10)^2$=1.375 Mbps

The use of fixed-duration transmissions (which means the packet size used by the STAs are of variable-length) in this way allows the high-rate STAs to enjoy the benefits of their higher data rate (approximately 14 times improvement in average throughput per user relative to fixed-length approach). Every user is given the same amount of time (303 µs) to access the medium for a data packet, which is a more equitable way to partition the bandwidth.

Generally, assuming there are M data rates in the system, $R1<R2<\ldots<RM$, and Ni STAs/users at rate Ri, $i=1,\ldots,M$. The maximum packet length for rate RM users is set to $LM=Lmax$, where Lmax is the maximum supported MSDU size in bytes (for example, Lmax=2304 bytes for 802.11). The maximum packet length for rate Ri users is set to $Li=Lmax/(RM/Ri)$, $i=1,\ldots,M-1$. This ensures that all packets are of equal duration, namely, Lmax/RM.

The AP may use these same principals when selecting a packet length for transmitting data to a STA.

The Contention Window Network Access Control Parameter

An alternative method which can be used to achieve similar performance as the fixed packet-duration approach (i.e., gives each user equal medium access time) is to keep the packet length fixed but vary the contention window (CW) size for each user, making it less likely for low rate users to win a channel contention than the high-rate users. To contend for a busy channel in an IEEE 802.11 WLAN, each STA generates a random integer between 0 and CW and stores the result in a back-off counter. The back-off counter is decremented whenever the channel remains idle for one time slot period (defined in the 802.11 standard), and transmits a packet when the counter hits zero. The interval (0,CW) is referred to as a contention window in 802.11. To apply the above procedure to the previous example, all users would be allowed to transmit 2 KB MSDUs, but the contention window for the low rate users, CWlow, may be set to 54 times larger than the high rate users, CWhigh, and thus the high-rate users would be 54 times more likely to transmit a packet than the low rate users. The parameter CW would be a MIB object stored locally for each STA.

Dynamic Adjustment of Network Access Control Parameters

Figure 4:
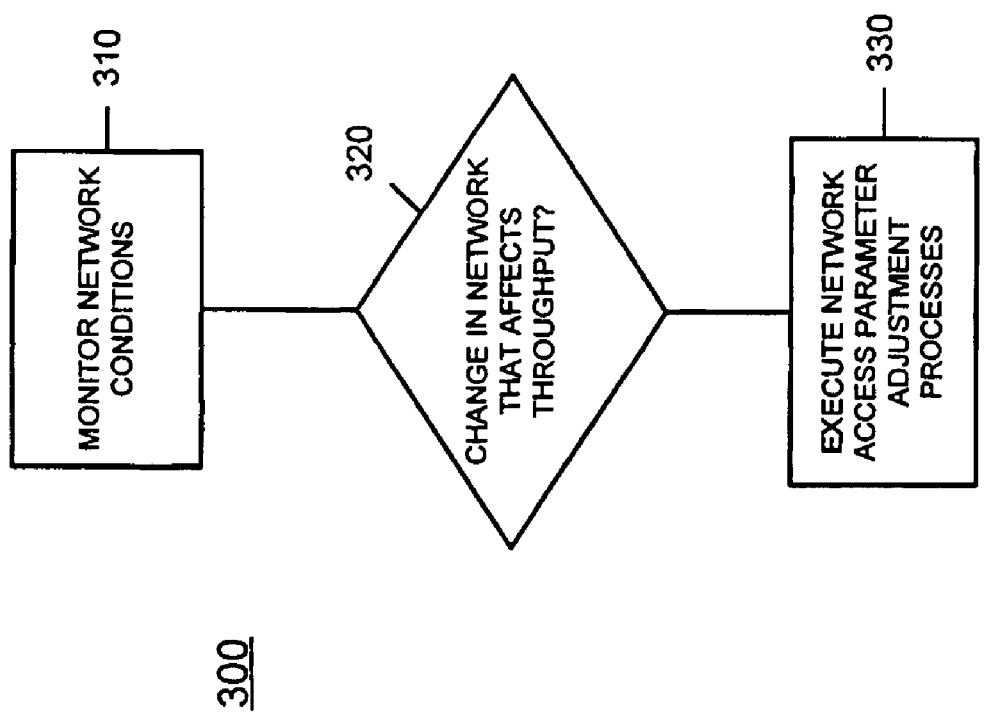
FIG. 4 is a flow chart of a network monitoring and access parameter adjustment process.
Figure 5:
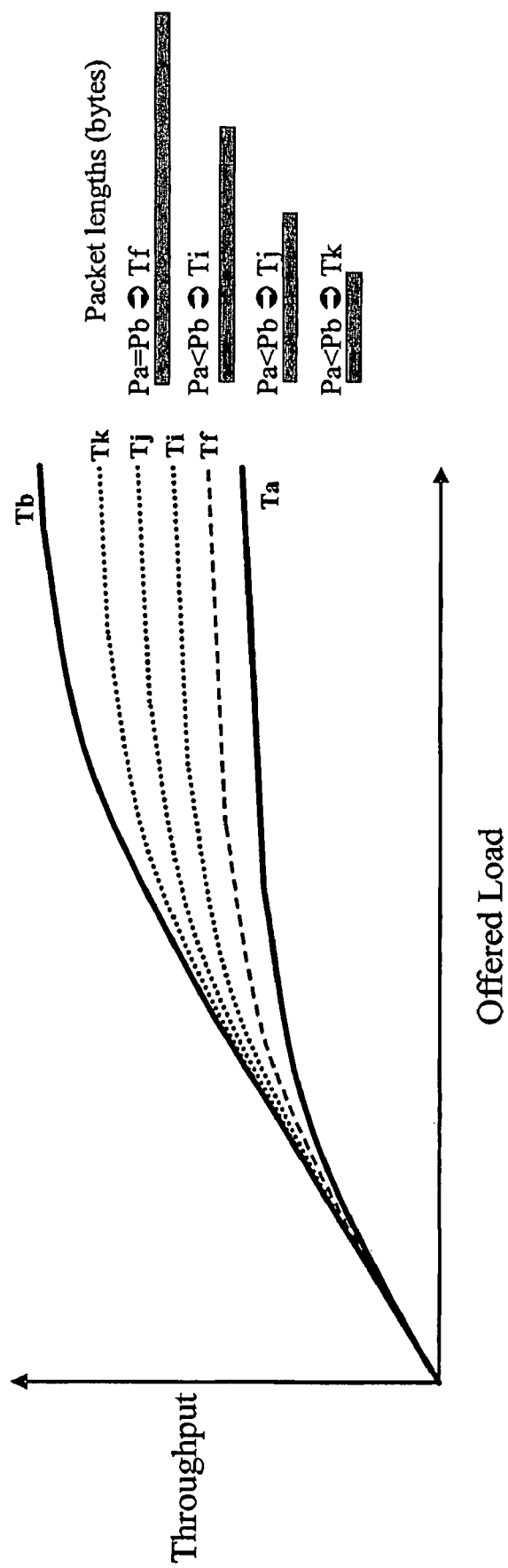
FIG. 5 is a plot of throughput versus offered load of a wireless network that illustrates the effects on throughput as the packet length is adjusted.

With reference to FIGS. 4 and 5, a process 300 is shown whereby conditions of the WLAN are monitored and changes are automatically made to the network access control parameters of devices in the network. In step 310, the AP monitors network conditions. For example, by receiving data from various STAs in the network, the AP can determine the access time to the network for each STA, and determine the average throughput of the network.

As shown in FIG. 5, assume a shared medium is used to support users a and b, where a and b can access the medium at different data rates, Ra and Rb respectively. Typical throughput versus offered load for users operating at only data rates of Ra and Rb is shown as Ta and Tb, respectively. When both types of users access the system, and their packets are equal in size, a throughput of Tf is obtained; the slower data rate dominates the throughput curve when access from the a and b users is equally likely. The primary effect beyond the knee of the throughput curve is an exponential increase in delay for users trying to access the medium, wherein the network is said to be overloaded. One mechanism to reduce the access time, for at least some users, is to not allow the lower rate users to access the channel, which moves the throughput curve to Tb. A better approach that allows a and b users to still access the system and is sensitive to access delay is to vary the packet lengths for different data rate users as the combined offered load starts to generate exponentially increasing access times. Throughput curves of Ti, Tj, and Tk can be achieved as the packet length of the lower rate user is further reduced relative to those of the higher rate users.

Thus, the methodology involves (in step 330) varying the packet length for users in the network in response to detecting conditions in the network (in step 310) that indicate that the offered load begins to result in increasing access times. The network is initialized in the "normal" state, i.e., all users are free to use packets of up to 2 KB in length (the maximum packet length). In step 310, the AP measures throughput for users in the network, particularly faster data rate users. If the AP determines (in step 320) that these users are achieving poor throughput (based on programmable thresholds depending on the number of users in the network, data rates, etc.), the AP will engage one of the schemes described above and transmit messages to the users to adjust their packet lengths (or contention window size). The longer the time required on the network between two different uses, the greater the difference in packet lengths for those users. In the event the AP determines that conditions in the network change to a state that is acceptable for fixed packet length operation, the AP will accordingly send messages to the users to reset the packet length to the fixed maximum packet length for all users (or return to the normal contention window size).

Alternatively, in step 310, the AP may monitor the data rate of the users on the network. The AP may periodically, or on occasion, determine if the fastest user operating in the network has changed. As users go on and off the network, network conditions change. What was previously the fastest user data rate may change when that fast user goes off the network. Similarly, slower rate users will come and go on the network. In step 320, the AP determines that a change has occurred in the network that affects network throughput. For example, the AP determines whether the fastest user in the network has changed, or whether the ratio (fast to slow) of data rate users in the network has changed sufficiently to justify a change to the maximum packet length or contention window. Then in step 330, the AP executes a change to a network access control parameter, such as the maximum packet length or contention window size.

In step 330, the AP may compute a new maximum packet length (Li) for user (i) according to the mathematical relationship provided above, but using information for the current fastest data rate user on the network. This provides for more dynamic and flexible control of throughput.

FIG. 6 shows a process 400 for updating a network access control parameter (e.g., maximum packet size or contention window size) for devices operating on the network. An IEEE 802.11 is the exemplary wireless network, but it should be understood that a similar process may be used in any other wireless network. In the context of 802.11, a method for updating maximum MSDU size at each STA involves adjusting the maximum transmit packet size at the Data-Link Protocol Interface (DLPI) between the network layer (e.g., IP) and the Logical Link Control (LLC) layer. This can be performed manually by a network administrator by updating the maximum packet size at each STA (via a message sent by the AP), or automatically by the AP sending an over-the-air message directing each STA to update its maximum packet size. No change to the 802.11 standard rules is required.

In general, in step 410, when the network layer in a STA sends an MSDU (a packet to be sent) using a MA-UNITDA-TA.request primitive to the LLC Driver, the LLC driver compares the size of the MSDU with the internally stored maximum packet size. Unless configured to be smaller than the maximum size, normally, the LLC Driver will respond in step 420 with a MA-UNITDATA-STATUS.indication primitive that indicates the MSDU size is acceptable so long as it is less than the maximum packet size.

When network conditions justify, the AP, in step 430, may send a message to a STA indicating that it should use a smaller maximum packet size in order to limit the STA to the appropriate fixed-duration air time. In step 440, the STA stores the updated maximum packet size internally. Now, in step 450, when the network layer in the STA sends an MSDU using the MA-UNITDATA.request primitive, the STA compares the size of the MSDU with the internally stored maximum packet size. If the size of the MSDU is too large, then in step 460, the LLC Driver responds with an MA-UNITDATA-STATUS. indication primitive where the transmission status in the primitive indicates that the submitted MSDU is too large. The network layer will be responsible for adjusting its internal state to use a smaller MSDU size and resending the data as a set of smaller MSDUs. The network layer may start with the largest acceptable MSDU (2304 bytes as currently defined in the 802.11 standard) and work its way down until it finds an MSDU size that is acceptable to the STA. This concept is similar to the concept specified in RFC1191 dealing with Path MTU Discovery. The network layer will maintain a list of sizes to try until it manages to find one that can be transmitted without being rejected. Each network layer is allowed to use whatever values it deems necessary in its list, as long as each entry in the list is smaller than the maximum MSDU size specified by 802.11.

As the limitation imposed on the packet size may be temporary, the network layer will be responsible for periodically trying to send larger MSDUs to see if they will be accepted. The network layer will try the algorithm again to see if it can get a larger MSDU accepted (again, this is similar to the concepts specified in RFC1191). In order to allow larger MSDUs to be sent again, the STA will maintain a timer that is set when it receives the notification from the AP to lower its maximum packet size. Until the timer expires, the STA will reject MSDUs that are larger than its internally stored value (that was received from the AP). When the timer expires, the STA will change the maximum packet size back to the maximum value specified by the 802.11 standard as represented by steps 470 and 480. This will potentially allow maximally sized MSDUs to be transmitted again. If the AP again sends the message telling the STA to limit its maximum packet size, the STA will reset its timer and continue to restrict the size of MSDUs that it will accept from the network layer.

Another technique to change the effective maximum packet size used by a device, such as a STA, is to fragment a data unit into fragments that are less than or equal to the maximum packet size. The AP may inform a STA to change its effective maximum packet size in the same manner as described above in conjunction with FIG. 6. Using the maximum packet size, a STA will break up a message to be sent into fragments that satisfy the maximum packet size, and send those fragments on the network.

Figure 2:
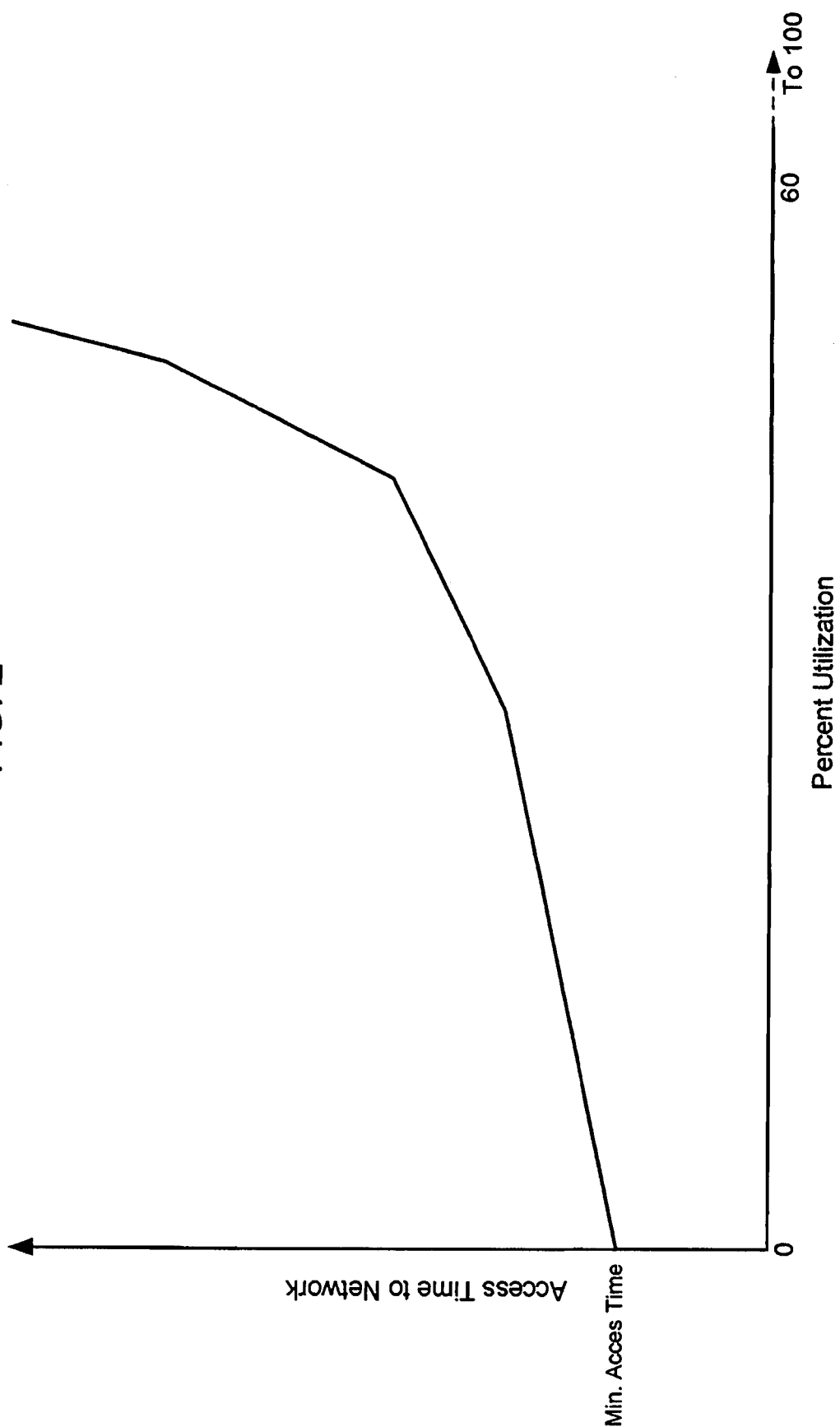
FIG. 2 is a plot showing access time versus percent utilization of a wireless network.

Referring again to FIG. 2, the techniques described herein would have beneficial effects on the access time versus percent utilization relationship of a network. Assigning slower users packet lengths or contention window parameters limits their access to the network, which has the effect of reducing utilization of the network, thereby maintaining lower access times to the network. In essence, practicing these techniques would push the curve shown in FIG. 2 outward to the right, which is desirable from a network administration standpoint.

While the foregoing description has been made with respect to the IEEE 802.11x standard, as an example, it should be understood that the present invention applies to any protocol standard governing the operation of a wireless network that has communication devices which operate at different data rates, and the communication devices share one or more frequency channels in the wireless network using carrier sense multiple access or other similar techniques. Furthermore, it should be understood that the terms "faster", "slower", "slow", "high" and "higher" refer to the transmission rate of a device that, either by virtue of its design or its location in the network relative to an access point, can transmit up to a certain data rate.

To summarize, in a wireless communication network having a plurality of devices contending for access to the network, wherein the plurality of devices include devices that operate at different data rates when transmitting data on the network, a method is providing for assigning network access parameters to one or more of the devices so as to control throughput on the network. The network access parameter may be a packet length of a contention window size.

Similarly, a wireless communication system is provided comprising a plurality of wireless communication devices capable of accessing a wireless network using carrier sense multiple access procedures for transmission of data, the plurality of devices including devices that operate at different data rates when transmitting data on the network, each device accessing the network according to a network access control parameter to permit access to the network in a controlled manner.

Further, a processor readable memory medium is provided which is encoded with instructions that, when executed by a processor (such as a processor in an access point or in a network administration computer), cause the processor to perform steps of determining the data rate with which each of a plurality of wireless devices access a wireless network; and assigning a network access parameter for one or more of the wireless devices so as to control throughput on the wireless network.

Further still, a wireless communication device is provided, which operates in a wireless network that employs carrier sense multiple access procedures. The device comprises a radio transceiver that transmits and receives radio frequency signals via the wireless network; and a processor that supplies signals to be transmitted by the radio transceiver and processes signals that are received by the radio transceiver, wherein the processor generates packets of data for transmission via the radio transceiver according to a network access control parameter configured to control throughput on the wireless network.

The above description is intended by way of example only.

What is claimed is:

1. A method for a wireless communication wherein a plurality of devices are contending for access to a network and the plurality of devices include devices that operate at different data rates when transmitting data on the network, the method comprising: dynamically assigning network access parameters to one or more of the devices so as to control throughput on the network, the parameters including a contention window network access control parameter by which a longer contention window interval is assigned for low data rate devices and a shorter contention window interval is assigned for high data rate devices, whereby the contention window interval is a maximum duration for a back-off counter that is decremented each idle time slot until reaching zero at which time the device attains access to the network and transmits a data packet.

2. The method as in claim 1, further comprising an access point in the network detecting increased access times for the devices and determining an unacceptable average throughput of the network, whereby the access point sends messages to the devices to adjust the network access parameter for a longer contention window size.

3. The method as in claim 2, further comprising the access point detecting decreased access times for the devices and determining an acceptable average throughput of the network, whereby the access point sends messages to the devices to adjust the network access parameter to return to a normal contention window size.

4. The method of claim 1, and further comprising the step of detecting when a device goes on or off the network, and in response thereto, modifying the network access parameters of one or more devices.

5. A wireless station (STA), comprising a processor configured to process:
   a logical link control (LLC) Driver configured to receive a message from an access point directing an update to a maximum transmit packet size parameter and to compare an intended transmit packet size to the maximum transmit packet size parameter; and
   a network layer configured to send a data transmission request primitive indicative of the intended transmit packet size to the LLC Driver and to receive data transmission response primitive from the LLC Driver indicative of whether the intended transmit packet size is smaller than or greater than the maximum transmit packet size parameter; whereby on a condition that the intended transmit packet size is greater than the maximum transmit packet size parameter, the size of the transmit packet is reduced to a size less than the maximum packet data size parameter.

6. The STA as in claim 5, further comprising a memory to store the maximum transmit packet size parameter.

7. The STA as in claim 5, further comprising a timer that is set once the message is received from the access point to reduce the maximum transmit packet size parameter, whereby upon expiration of the timer after a fixed duration, the network layer changes the intended transmit packet size back to an initial value that is greater than the reduced transmit packet.

* * * * *